United States Patent [19]

Reneau

[11] Patent Number: 4,613,160
[45] Date of Patent: Sep. 23, 1986

[54] REMOTELY OPERABLE PIPE LENGTH CONNECTOR AND COMPENSATOR

[75] Inventor: Bobby J. Reneau, Houston, Tex.

[73] Assignee: Gripper, Inc., Houston, Tex.

[21] Appl. No.: 618,436

[22] Filed: Jun. 8, 1984

[51] Int. Cl.[4] ............................................. F16L 35/00
[52] U.S. Cl. ...................................... 285/18; 285/93; 285/315; 285/323; 285/920
[58] Field of Search ............... 285/920, 315, 323, 322, 285/24, 27, 18, 93

[56] References Cited

U.S. PATENT DOCUMENTS

| 4,006,921 | 2/1977 | Mohr | 285/18 |
| 4,049,297 | 9/1977 | Reneau | 285/DIG. 21 |
| 4,138,147 | 2/1979 | Manchester et al. | 285/323 X |
| 4,290,632 | 9/1981 | Manchester et al. | 285/323 |
| 4,433,859 | 2/1984 | Driver et al. | 285/DIG. 21 |
| 4,526,406 | 7/1985 | Nelson | 285/DIG. 21 |

FOREIGN PATENT DOCUMENTS 2038967 7/1980 United Kingdom ............... 285/323

Primary Examiner—Dave W. Arola
Attorney, Agent, or Firm—Pravel, Gambrell, Hewitt & Kimball

[57] ABSTRACT

A remotely actuable device for connecting together pipeline end portions that may be positioned at varying distances from each other including a hydraulic actuation mechanism utilized in combination with a series of housing and camming surfaces to effect gripping and sealing action.

15 Claims, 2 Drawing Figures

REMOTELY OPERABLE PIPE LENGTH CONNECTOR AND COMPENSATOR

TECHNICAL FIELD OF THE INVENTION

This invention relates to apparatus for connecting together first and second flowline members remotely wherein such flowline members may be at varying distances from each other.

BACKGROUND OF THE INVENTION

The search for oil offshore has moved drilling and production activity further and further out to sea into deeper and deeper water. Activities now being carried on, such as the replacement of pipeline risers and the making of pipeline repairs, are at depths which exceed the safe level of operation for divers. In order to operate at such extensive depths, the utilization of a Remote Operated Vehicle (ROV) has become more and more common. An ROV is a propeller driven, fully remotely operable underwater vehicle utilizing TV cameras for eyes and having gripping arms and hydraulic power connections. The ROV can be completely controlled from a surface vessel and thus offers the advantage of avoiding the endangerment of human life. As the use of ROV submarines has increased, the need for adapting previously diver-type functions to diverless functions has emerged. One area in need of diverless operation is the repair and/or connection of oil and gas pipelines at such extensive depths.

A known technique for repairing a pipeline is to provide a repair spool which may be lowered down into alignment with pipeline ends which need to be re-connected together. Such a repair spool may include at each end or at one end a pivotal ball connector which allows the repair spool to be connected to each end of the pipeline to be repaired and compensates for some misalignment between the pipeline ends to be connected together by the repair spool. The Applicant here has recently filed U.S. patent application Ser. No. 608,384 entitled "Remote Ball Connector" which discloses a remote ball connector which may be mounted at one or both ends of a repair spool for the purpose of connecting such a repair spool to pipeline ends even though misalignment is present. The device disclosed in the patent application entitled Remote Ball Connector may be installed without the need of divers utilizing the ROV submarine.

Another part of such a repair spool is a pipe length compensator which is provided to connect together first and second repair spool pipe members to allow some relative axial movement between them so that the final length of the spool may be adjusted when in place. In order for such final repair spool length to be adjusted on site, it is necessary that a final gripping and sealing connection be made between the two pipe members of the repair spool on site in order to prevent leakage and to hold the repair spool portions in a rigid alignment. Such pipe length compensators are generally known in the art. For example, U.S. Pat. No. 4,138,147 discloses a pipe length compensator or variable length coupling device which is installed by a diver and includes flange bolt connections which actuate gripping and sealing elements in response to further connection of first and second housing members together. There have also been a number of attempts to utilize hydraulic power to connect together pipe portions. However, it is believed that the effectiveness of presently known, hydraulically operated pipe connector designs needs improvement and therefore this invention is directed to an improved pipe length compensator which utilizes hydraulic power and mechanical wedging action to effect the final connection.

SUMMARY OF THE INVENTION

It is an object of this invention to provide a new and improved pipe length connector and compensator for connecting together pipeline portions at varying distances there between. Such a pipe length compensator is remotely operable through the utilization of hydraulic power to effect the final gripping and sealing action. The pipe length compensator and connector of this invention includes a first housing adapted for connection to a first flowline portion and a second housing cooperating with the first housing to receive a second flowline portion which extends through the second housing into the first housing. The second housing includes first and second body members and connection means are mounted with the first and second body members for connecting them together. The first housing and the second housing cooperate to perform a grip/seal bore therein through which the second flowline portion extends into the first housing. Seal means are mounted in the grip/seal bore for movement into sealing engagement against the second flowline portion. Actuator means is mounted within the grip/seal bore for movement into engagement with the seal means to move the seal means into sealing engagement with the second flowline. A force transfer means is mounted within the grip/seal bore for movement into engagement with the actuator means, the force transfer means being positioned adjacent to and in engagement with the second body of the second housing such that movement of the second body moves said force transfer means. A remotely actuable means is mounted with the first and second body members for engagement with a portion of the first housing and the first body member to move the first body member away from the first housing portion to thereby move the second body member toward the first housing to cause the second body member to engage the force transfer means, which force transfer means engages the actuator means and the actuator means engages the seal means to cause the seal means to seal against the second flowline. After the seal is set, the force transfer means causes a gripping of the second flowline.

This description of the invention is intended as a summary only and is not intended to set out all features which are believed to be patentable. The features believed to be patentable are disclosed in the specification and claims to follow.

DESCRIPTION OF THE PREFERRED EMBODIMENT

Figure 1:
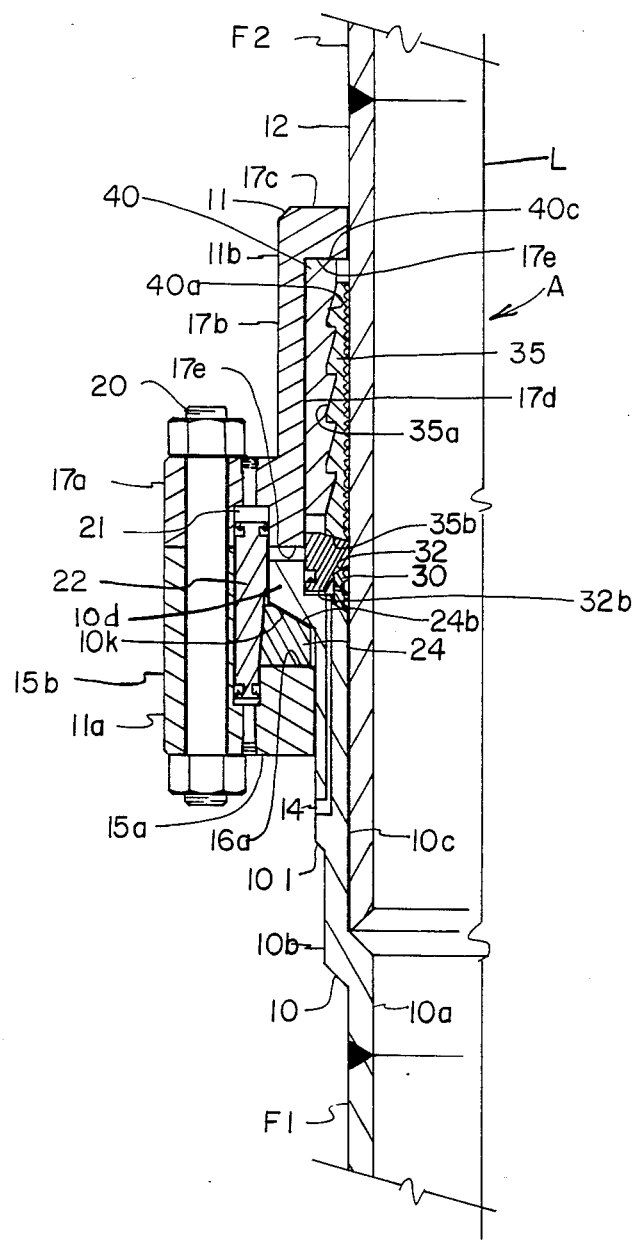
FIG. 1 is a sectional view of the pipe length connector and compensator of this invention in the pre-actuation position.

Referring to the drawings, the apparatus A of the preferred embodiment of this invention for connecting pipeline portions together is illustrated. As mentioned in the Background of the Invention, one use of the apparatus A is to provide a pipe length compensator bore 10c. A cylindrical portion 10g meets and extends axially from the frusto-conical portion 10f and ends at an annular radial face 10h which meets cylindrical face 10i, which cylindrical face 10i terminates at the end radial face 10e. The outside surfaces of the annular rim portion 10d includes an outside cylindrical surface 10j which meets an inclined, frusto-conical surface 10k which meets the main outer cylindrical surface or wall 101 of the second section 10b of the first housing member 10. With respect to the first housing 10, a test bore 14 extends through the second section 10b of the first housing 10 and terminates at radial face 10h. It is further noted that the outer frusto-conical surface 10k is tapered radially outwardly toward radial, annular end-face 10e.

It should be understood that the distance from the annular end portion 10d of the second section 10b of the housing 10 to the first section 10a may be varied according to particular application and additionally, the actual position of the end of the flowline F-2 can be somewhat varied within the second section 10b such that the apparatus A can be utilized to connect together flowline portions F-1 and F-2 even with some variation in distance between them. Typically, when the apparatus A forms part of a repair spool as previously described, the distance between F-1 and F-2 is approximately known and thus it is only necessary to adjust the position of F-2 within the second section 10b of the first housing 10 slightly to obtain the proper distances prior to connection; however, it is important that the apparatus A can operate to connect together the flowline in F-2 and compensate for final, unexpected distance between F-1 and F-2.

The second housing 11 includes a first body member 11a and a second body member 11b. The first body member 11a is basically L-shaped in cross-section and is formed of a radial portion 15a and an axial portion 15b machined connecting portions of a repair spool together, the repair spool being used to connect together two flowlines separated as the result of the removal of a damaged pipeline section or for other reason. For the purposes of description herein, the apparatus A will be described generally as connecting together a first flowline portion F-1 and a second flowline portion F-2. The flowline portions F-1 and F-2 may be pipeline repair spool portions or may be other pipeline members which need to be connected together for any reason, such as repair or otherwise.

The apparatus A of the preferred embodiment of this invention includes a first housing 10 which is welded to the flowline F-1. A second housing generally designated as 11 is positioned adjacent to the first housing 10 and is connected to the first housing 10 for cooperating with the first housing 10 to receive the second flowline F-2. The second flowline F-2 may be connected to a pipe member 12 through welding, the pipe member 12 actually extending into the second housing 11 and first housing 10. Hereinafter, the pipe member 12 will simply be described and understood to be part of the flowline F-2.

The housing 10 includes a first section 10a having an internal bore which is substantially the same diameter as the internal bore of the flowline F-1. The first housing 10 further includes a second section 10b having an internal bore 10c which is defined by an internal cylindrical wall, which internal bore 10c has a diameter which is larger than the diameter of the first internal bore of the first section 10a. The second internal bore 10c is sized to receive the flowline F-2.

Figure 2:
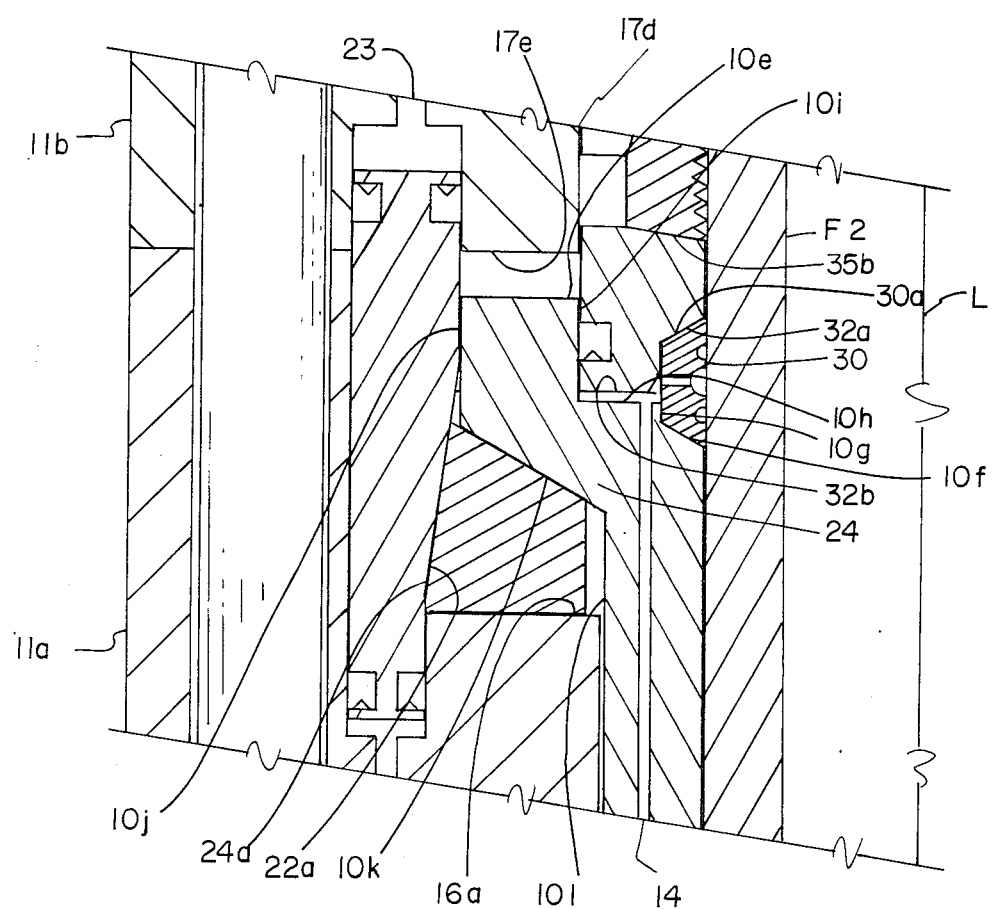
FIG. 2 is an enlarged view of the gripping and sealing structure of this invention.

The first housing 10 further includes a third housing section 10d which is an annular, raised end or rim portion which terminates in a radial face 10e. Referring to FIG. 2, the annular end or rim portion 10d includes a inclined, frusto-conical surface 10f which extends outwardly from the wall of the second section as one piece. The radial portion 15a includes an opening of a diameter substantially equal to the outer diameter of the second section 10b of the first housing 10 such that the first body member fits over the first housing 10. The first body member 11a includes an interior, radial face 16a which is spaced from but opposite to the outer frusto-conical surface 10k on the annular rim portion 10d.

The second body member 11b is generally L-shaped and includes a radial portion 17a, a cylindrical portion 17b and an annular end portion 17c. The end portion 17c has an opening to receive the flowline F-2. The cylindrical portion 17b includes an interior cylindrical wall 17d which cooperates with end wall 17e on the body end portion 17c as well as cylindrical face 10i, radial face 10h, cylindrical face 10g and frusto-conical face 10f on the annular rim portion 10d of the first housing 10 to form a grip/seal bore. The grip/seal bore is therefore an annular space provided by the second body member 11b and the annular rim portion 10d of the first housing 10 which envelops the flowline F-2 inserted through second body member 11b into the first housing 10.

The first body member 11a and the second body member 11b are connected together by a suitable connection means, which is a plurality of circumferentially spaced bolt assemblies 20 which extend through the axial portion 15b of the first body member and the radial or flange portion 17a of the second body member. The bolt assemblies 20 extend through suitably aligned bores in such axial portion 15b in the first body member 11a and through the radial portion 17a of the second body member 11b. The second body member 11b terminates in an internal radial face 17e which is spaced from the radial face 10e of the annular rim portion 10d of the first housing.

The first body member 11a and the second body member 11b further cooperate to provide an annular piston bore generally designated as 21 therein. The piston bore is provided by aligned and machined internal surfaces which provide a generally rectangular bore as viewed in the cross-section of FIGS. 1 and 2. A piston ring 22 is mounted within the piston bore 21 and includes suitable seals on inside and outside surfaces such that the piston ring is mounted for axial, slideable, sealed movement within the piston bore 21. The piston ring 22 includes an internal, annular, inclined wedging surface 22a which is inclined at a slight angle with respect to the longitudinal axis L of the apparatus A.

A body camming ring 24 is mounted within an annular ring space or groove formed between the wedging surface 22a of the piston 22, the inclined frusto-conical external housing end portion surface 10k, outside wall 101 on the first housing and radial internal face 16a of the first body member 11a. The body camming ring 24 is actually a series of ring-segments which are mounted for radially inwardly movement in response to axial movement of the piston 22 in the direction of the first housing 10 and first flowline F-1.

The piston 22 cooperates with the body camming ring 24 to provide a remotely actuable means mounted with the first body member 11a and second body member 11b for engaging the annular rim portion 10d of the first housing and the first body member 11a to move the first body member 11a away from the annular rim portion 10d of the first housing 10. The piston 21 is remotely actuable by the introduction of hydraulic fluid through port 23, which hydraulic fluid under pressure may be provided by an ROV. Movement of the piston 22 toward the first flowline F-1 causes the internal piston wedging surface 22a to engage a complementary wedging surface 24a on the outside of the body camming ring 24 thus moving the body camming ring 24, including its individual segments, radially inwardly. Movement of the body camming ring 24 radially inwardly causes the inner engagement of the ring inclined wedging surface 24b against the outer frusto-conical surface 10k of the annular rim portion 10d of the first housing 10, which wedging action forces the first body member 11a toward the first flowline F-1 and away from external frusto-conical annular surface 10k on the annular rim portion 10d. Since the first body member 11a and the second body member 11b are connected together by the bolt assemblies 20, movement of the first body member 11a toward the flowline F-1 moves the second body member 11b in the same direction.

A seal ring 30 is mounted within the grip/seal bore adjacent to frusto-conical interior annular surface 10f. The seal ring 30 is trapezoidal in cross-section and includes an outside, cylindrical surface and opposingly tapered side surfaces 30a. The interior surface of the seal ring is serrated to include teeth such that, upon deformation of the seal ring radially inwardly, the teeth bite into and sealingly engage the flowline F-2 therein. The seal ring is thus made of a slightly deformable material, preferably a metal, such that a metal-to-metal seal is effected by radially inwardly movement of the seal ring 30.

An actuator ring 32 is also mounted within the grip/seal bore adjacent to the seal ring 30. The actuator ring 32 includes an interior cylindrical face of a diameter substantially equal to the diameter of the seal 30, which is substantially the same diameter as the diameter of the outside wall of the flowline F-2. The actuator ring 32 includes an outer cylindrical surface which mates against the cylindrical surface 17d of the grip/seal bore and has a suitable 0-ring therein to prevent the passage of fluid inwardly between the outer surface of the actuator ring 32 and the cylindrical face 10i of the annular rim portion 10d of the first housing 10. The interior of the actuator ring 32 further includes a frusto-conical surface 32a which is complementary to a frusto-conical side surface or wall 30a of the seal ring 30. A side radial face 32b of the actuator ring 32 is shown slightly spaced from the radial face 10h of the annular rim portion 10d of the first housing such that the actuator ring is movable a limited distance toward flowline F-1. The actuator ring 32 includes a test port which is alignable with the test port or bore 14 in the second section 10b of the first housing 10 in order to test the sealing engagement of the seal ring 30 against the flowline F-2 after actuation.

A force transfer means is provided by a generally cylindrical gripping collet 35 and a force transfer sleeve 40. The generally cylindrical gripping collet 35 is mounted within the grip/seal bore and has an internal cylindrical face which provides a plurality of teeth for actually gripping the flowline F-2. The external face or cylindrical wall of the collet 35 includes a plurality of inclined, camming surfaces 35a which are arranged in rows or in a spiral pattern on the outside wall of the collet 35. The collet 35 terminates on its interior end in an inclined annular face 35b which engages a complementary, inclined face on the actuator ring 30. The force transfer sleeve 40 is also a generally cylindrical member which is mounted within the grip/seal bore over the collet 35. The force transfer sleeve 40 has an interior face which includes a plurality of internal camming surfaces 40a complementary to the external camming surfaces 35a of the collet 35. Upon relative movement of the force transfer sleeve 40 toward the flowline F-1 with respect to the collet 35, the collet 35 is first moved axially by a horizontal component of the force of engagement of the camming surfaces 40a and then, after axial movement of the collet is limited the vertical component of the force of engagement of the camming surfaces moves the collet radially inwardly into gripping engagement with the flowline F-2.

The force transfer sleeve 40 has a smooth external wall of a generally cylindrical configuration which has a diameter substantially equal to the diameter of the inside wall 17d of the second body member 11b. The outside radial face 40c of the force transfer sleeve engages the interior radial face 17e of the end portion 17c of the second body member 11b.

It is further noted that the gripping collet 35 may include a series of machined slots which open alternately to opposite ends of the collet 35 such that the collet 35 is radially compressible and can be moved by the force transfer sleeve 40 radially inwardly into gripping engagement with the flowline F-2.

In operation, after the apparatus A, which may be part of a pipe repair spool as previously discussed, is lowered into position with the flowline F-2 inserted through the second body member 11b into the second section 10b of the first housing 10, a hydraulic line is connected to port 23 in the second body member 11b. The hydraulic line may be connected to an ROV or other source of hydraulic fluid under pressure. Hydraulic fluid under pressure is introduced into the piston bore 21 through port 23 thereby moving the piston 22 axially toward the flowline F-1. Movement of the piston 22 toward the flowline F-1 causes the internal wedging surface 22a on the piston to engage and cam against the external wedging surface 24a on the body camming ring 24 thus moving the body camming ring 24 radially inwardly. Movement of the body camming ring 24 radially inwardly causes engagement of the internal camming surface 24b against the external inclined conical surface 10k on the annular rim portion 10d of the first housing 10 thereby pushing the first body member 11a of the second housing 11 away from conical face 10k. Movement of the first body 11a away from conical face 10k and thus toward flowline F-1 moves the second body 11b due to the bolt connection between the two body members. Movement of the second body 11b axially toward toward the flowline F-1 causes engagement of the internal end portion face 17e against the end face 40c of the force transfer sleeve 40 thereby moving the force transfer sleeve axially toward the flowline F-1. Movement of the force transfer sleeve 40 axially toward the flowline F-1 causes first axial movement of the collet 35 into further engagement with actuator ring 32 and consequent axial movement of the actuator ring 32 against the seal ring 30. The ring 32 has an inwardly inclined frusto-conical annular side surface 32a which cooperates with a complementary inclined surface 30a on the seal ring 30 to press axially and radially inwardly against the seal ring 30. The seal ring 30 has an oppositely inclined surface which engages internal frusto-conical surface 10f of the annular rim portion 10b such that the surfaces 10f on the annular rim portion 10d and the surface 32a on the actuator ring 30 cooperate to move the seal ring 30 radially inwardly into a metal-to-metal seal against the flowline F-2. This metal-to-metal seal is effected upon axially travel of the actuator ring 32 which is completed when face 32b on the actuator ring 32 engages radial face 10h on the annular rim portion 10d. After the actuator ring 32 has engaged face 10h, further axial movement is prevented and thus the collet 35 is prevented from further axial movement. Thereafter, further relative axial movement of the force transfer sleeve 40 causes the internal camming surfaces 40a to cam the collet 35 radially inwardly into a locking, gripping engagement against the flowline F-2. In this manner, although hydraulic power is utilized to finally actuate the entire apparatus A, the gripping and sealing mechanism is a mechanical mechanism utilizing a series of camming surfaces to effectively provide a metal-to-metal seal and firm grip upon the flowline F-2.

The foregoing disclosure and description of the invention are illustrative and explanatory thereof, and various changes in the size, shape and materials, as well as in the details of the illustrated construction may be made without departing from the spirit of the invention.

I claim:

1. A pipe length connector and compensator for connecting together pipeline portions with a varying distance therebetween, comprising;

a first housing adapted for connection to a first flowline portion;

a second housing cooperating with said first housing to receive a second flowline portion which extends through said second housing into said first housing; said first and second housings having a common central axis;

said second housing including first and second body members and connection means are mounted with said first and second body members for connecting together said first and second body members;

said first housing and said second housing cooperating to form a grip/seal bore therein through which said second flowline portion extends into said first housing, said second body member having an annular end portion which defines a part of said grip/seal bore;

seal means mounted in said grip/seal bore for movement into sealing engagement against said second flowline portion;

actuator means mounted in said grip/seal bore for movement into engagement with said seal means to move said seal means into sealing engagement with said second flowline;

force transfer means mounted within said grip/seal bore for axial movement into engagement with said actuator means, said force transfer means being positioned between said actuator means and second body annular end portion and adjacent to and in engagement with said annular end portion of said second body member; and remotely actuable means mounted with said first and second body members for engagement with a portion of said first housing and said first body member to move said first body member in an axial direction away from said first housing portion to thereby move said second body member axially toward said first housing to cause said annular end portion of said second body member to axially engage said force transfer means, said force transfer means axially engaging said actuator means and said actuator means engaging and moving said seal means radially inwardly to seal against said second flowline.

2. The structure set forth in claim 1, including:

said force transfer means includes grip means mounted within said grip/seal bore for movement into gripping engagement with said second flowline member; said grip means being mounted in operative engagement with said force transfer means and each of said force transfer means and grip means having camming means to cause said grip means to move axially toward said first housing and radially inwardly in response to engagement of said force transfer means by said annular end portion of said second body member.

3. The structure set forth in claim 1, wherein said force transfer means includes:

a generally cylindrical collet member mounted within said grip/seal bore;

a force transfer sleeve mounted over said collet member, said force transfer sleeve and said collet including camming means for moving said collet in response to movement of said force transfer sleeve;

said force transfer sleeve being positioned in engagement with said annular end portion of second body whereby axial movement of said second body causes axial movement of said force transfer sleeve.

4. The structure set forth in claim 3 including:

said first housing terminates in a rim end portion;

said first body member of said second housing being mounted over said rim end portion of said first housing;

said second body being connected to said first body by said connection means;

said remotely actuable means including remotely actuable wedge means positioned between said rim end portion of first housing and said first body member for moving said first body member axially away from said rim end portion of said first housing thereby moving said second body member toward said first housing.

5. The structure set forth in claim 4, including:

said first housing rim end portion being an annular rim portion having an external frusto-conical surface;

said wedge means including a body camming ring mounted with said first body for movement radially inwardly, said body camming ring having a first frusto-conical surface for engaging said external frusto-conical surface of said annular-rim portion, said body camming ring also being in engagement with said first body member whereby movement of said body camming ring radially inwardly moves said first body member away from said external frusto-conical surface.

6. The structure set forth in claim 5, including:

said external frusto-conical surface of said annular rim portion facing away from said second body member of said second housing.

7. The structure set forth in claim 6, including:

a portion of said first body member being positioned oppositely to said external frusto-conical surface of said annular rim portion with said wedge means positioned therebetween.

8. The structure set forth in claim 1, wherein said seal means includes:
a seal ring mounted within said grip/seal bore;
said actuator means includes an actuator ring mounted in said grip/seal bore in engagement with said seal ring, said seal ring and said actuator ring having cooperating, engaged surfaces inclined with respect to said central housing axis; and
said force transfer means being mounted for engagement with said actuator ring for moving said actuator ring into further engagement with said seal ring, said cooperating surfaces said actuator ring and said seal ring cooperating to move said seal ring into sealing engagement with said second flowline portion.

9. The structure set forth in claim 8, including:
said first housing having an annular rim portion with an internal frusto-conical surface;
said actuator ring having a frusto-conical surface;
said seal ring having oppositely tapered frusto-conical surfaces complementary to said internal frusto-conical surface on said annular rim portion and said frusto-conical surface on said actuator ring whereby axial movement of said actuator ring causes said actuator ring and first housing to coact to move said seal ring into sealing engagement with said second flowline member.

10. The structure set forth in claim 8, including:
a collet member mounted within said grip/seal bore in engagement with said actuator ring;
said force transfer means including a force transfer sleeve mounted over said collet member and being in engagement with said annular end portion of said second body member for movement in response to movement of said second body member;
said collet having an external surface having a plurality of camming surfaces and said force transfer sleeve having internal camming surfaces which engage said camming surfaces of said collet to move said collet axially and radially in response to movement of said force transfer sleeve.

11. The structure set forth in claim 10, including:
said collet being positioned in engagement with said actuator ring whereby the sequence of engagement is from said second body to said force transfer sleeve to said collet to said actuator ring to said seal ring.

12. The structure set forth in claim 10, including:
said actuator ring being positioned in said grip/seal bore for limited movement, such limited movement moving said seal ring into sealing engagement with said second flowline portion;
said force transfer sleeve internal camming surface moving said collet into gripping engagement with said second flowline member.

13. The structure set forth in claim 10, wherein:
said remotely actuable means comprises a piston bore within the first and second body members and a piston sealably mounted in the piston bore for movement in response to the introduction of hydraulic fluid under pressure.

14. The structure set forth in claim 13, including: an annular rim portion on said first housing, including:
a body camming ring mounted in said piston bore between said annular rim portion of said first housing and first body member, said body camming ring including a first frusto-conical surface, said annular rim portion of said first housing having an outer frusto-conical surface complementary to said body camming ring frusto-conical surface and being in engagement therewith;
said body camming ring being mounted in said piston bore for movement radially inwardly;
said piston having a wedging surface and said body camming ring having wedging surface engaged by said piston whereby movement of said piston causes said wedging surface of said piston to engage said wedging surface of said body camming ring to move said body camming ring radially inwardly.

15. A pipe length connector and compensator for connecting together pipeline portions with a varying distance therebetween, comprising:
a first housing adapted for connection to a first flowline portion and having a bore therein to receive a second flowline portion;
a second housing adapted to cooperate with said first housing to receive said second flowline portion which extends through said second housing into said first housing;
said second housing including a first flanged body and a second flanged body, said first and second body sections being connected together by a plurality of bolt connections;
said first housing terminating in annular rim portion, said first body of said second housing being mounted over said annular rim portion of said first housing;
said second body having an annular end portion and said annular rim portion of said first housing cooperating therewith to form a grip/seal internal bore;
said annular rim portion of said first housing having an internal frusto-conical surface;
a seal ring mounted within said grip/seal bore and having opposing frusto-conical surfaces, one of which is positioned to engage said internal frusto-conical surface on said annular rim portion of said first housing;
an actuator ring mounted in said grip/seal bore and having a frusto-conical surface complementary to the other of said opposing surfaces on said seal ring whereby movement of said actuator ring toward said first housing causes the frusto-conical surface of said actuator ring and said internal frusto-conical surface on said first housing annular end portion to wedge said seal ring radially inwardly into sealing engagement with said second flowline portion;
a generally cylindrical gripping collet mounted within said grip/seal bore and including an end portion position in engagement with said actuator ring, said gripping collet having an outside cylindrical surface which includes a plurality of camming surfaces;
a force transfer sleeve which is generally cylindrical mounted over said gripping collet and having internal camming surfaces which engage said outside camming surfaces on said gripping collet said force transfer sleeve having an end portion which engages said annular end portion of said second body such that movement of said second body of said second housing toward said first housing causing axial movement of said force transfer sleeve;
said first and second body members of said second housing having a piston bore therein and a piston mounted within said piston bore for axially directed movement by the injection into said piston bore of hydraulic fluid;

a body camming ring mounted in said piston bore between said annular rim portion of said first housing and said first body member, ring mount means formed by said first body member and said annular rim portion of said first housing to mount said camming ring for radially inward movement, said body camming ring including a first frusto-conical surface, said annular rim portion of said first housing having an outer frusto-conical surface complementary to said body camming ring frusto-conical surface and in engagement therewith;

said piston having a wedging surface and said body camming ring having a wedging surface engaged by said piston whereby axial movement of said piston causes said wedging surface of said piston to engage said wedging surface of said body camming ring to move said body camming ring radially inwardly which causes said body camming ring frusto-conical surface to cam against said outer frusto-conical surface of said annular rim portion of said first housing thus causing said second body member to move axially toward said first housing and said first body member to move axially away from said first housing, the second body member engaging the force transfer sleeve which moves said force transfer sleeve toward said first housing thus causing said gripping collet to move axially and move said actuator ring toward said first housing to move said seal ring into sealing engagement with said second flowline portion and then causing said internal camming surface of said force transfer sleeve to further engage said external camming surfaces of said gripping collet to move said gripping collet into gripping engagement with said second flowline portion.

* * * * *

UNITED STATES PATENT AND TRADEMARK OFFICE
CERTIFICATE OF CORRECTION

PATENT NO. : 4,613,160
DATED : SEPTEMBER 23, 1986
INVENTOR(S) : BOBBY J. RENEAU

It is certified that error appears in the above—identified patent and that said Letters Patent is hereby corrected as shown below:

Column 3, Line 1; the words "Bore 10c." through and including
 Column 3, Line 38, the word "machined" should be deleted,
 and inserted in Column 4, Line 8; between the words
 "section" and "as one".

Column 4, Lines 58, 64 and 66; after "piston" and before "22",
 insert -- ring --.

Signed and Sealed this

Eighteenth Day of August, 1987

Attest:

DONALD J. QUIGG

*Attesting Officer*   *Commissioner of Patents and Trademarks*